United States Patent [19]

Beyer et al.

[11] 4,185,843
[45] Jan. 29, 1980

[54] FRICTION WEAR EXPERIENCING MACHINE PART HAVING A COATING ON ITS SLIDING SURFACE

[75] Inventors: Horst Beyer; Ulrich Buran, both of Burscheid; Hans-Joachim Neuhäuser, Bergisch-Gladbach, all of Fed. Rep. of Germany

[73] Assignee: Goetze AG, Burscheid, Fed. Rep. of Germany

[21] Appl. No.: 918,439

[22] Filed: Jun. 23, 1978

[30] Foreign Application Priority Data

Jun. 25, 1977 [DE] Fed. Rep. of Germany ....... 2728725
Jan. 27, 1978 [DE] Fed. Rep. of Germany ....... 2803568

[51] Int. Cl.² .................... F16J 9/02; F16J 9/12
[52] U.S. Cl. .................... 277/224; 277/194; 277/195; 277/198
[58] Field of Search ............ 277/194, 195, 198, 223, 277/199, 224, 225, 119

[56] References Cited

U.S. PATENT DOCUMENTS

| 2,212,042 | 8/1940 | Phillips et al. | 277/195 |
| 2,583,957 | 1/1952 | Marvin | 277/223 |
| 2,640,746 | 6/1953 | Phillips et al. | 277/223 X |
| 2,908,537 | 10/1959 | Kipp | 277/223 |
| 2,927,831 | 3/1960 | Tuczek | 277/198 X |
| 3,669,461 | 6/1972 | Togami | 277/224 X |
| 3,814,447 | 6/1974 | Prasse et al. | 227/274 |
| 3,944,236 | 3/1976 | Takao | 277/224 |

FOREIGN PATENT DOCUMENTS

| 653363 | 11/1928 | France | 277/225 |
| 1284943 | 1/1962 | France | 277/225 |
| 1269704 | 4/1972 | United Kingdom | 277/224 |

*Primary Examiner*—Robert S. Ward, Jr.
*Attorney, Agent, or Firm*—Spencer & Kaye

[57] ABSTRACT

A machine part, such as a piston ring or sealing strip for an internal combustion engine, having one surface arranged to be in sliding contact with a cooperating part to thus be subjected to friction wear, the machine part being provided with a recess extending inwardly from the one surface and presenting at least one lateral wall, and the machine part comprising a layer of material different from the material of the machine part, which layer is disposed in the recess at the sliding surface, in which the layer is held in the recess in a manner such that no bond exists between the layer and the lateral wall.

18 Claims, 7 Drawing Figures

FRICTION WEAR EXPERIENCING MACHINE PART HAVING A COATING ON ITS SLIDING SURFACE

BACKGROUND OF THE INVENTION

The present invention relates to a machine part of the type which is subject to friction wear, as in particular a piston ring or a sealing strip in an internal-combustion engine, of the type having a coating on its sliding surface and designed to have unilateral or bilateral, i.e. single or dual, chambers.

Machine parts which are subject to wear, such as, in particular, piston rings or sealing strips of internal combustion engines, and which are subject to high thermal and mechanical stresses, are known to be provided on their sliding surfaces with coating layers which increase their wear resistance, their resistance to burn traces and their sliding properties. Preferably such layers are applied by means of known thermal spray processes and sprayed layers of molybdenum or molybdenum alloys have been found to be particularly satisfactory.

The drawback of such layers, however, is that their outer edges are relatively brittle and break easily and must therefore be sloped. Thus they do not have a sharp outer edge which rests closely against its countersurface, e.g., against the cylinder wall, so that in internal-combustion engines in particular there may occur exhaust gas leaks, also known as blow-by. At the same time such rings do not produce an oil stripper effect. It has therefore been known for some time to provide channels in the base material of these machine parts and to fill these channels with the coating layer. Depending on whether a land of the base material has been left at only one outer edge or lands are left at both outer edges, the layer is said to be arranged in a unilateral or bilateral chamber design. In other cases, a plurality of parallel channels are formed in the base material and are then filled with the coating layer.

The thus coated machine parts have sharp outer edges with a good sealing effect and simultaneously good sliding properties but, particularly under high thermal and mechanical stresses, cracks may develop in the area of the chamber lands either in the coating layer itself or between the coating layer and the base material. Such cracks may extend to the bottom of the coating layer, from there along the layer laminate and then in a bend toward the top to the sliding surface. Depending on the time they are in use or the stresses to which they are subjected, whole regions of the coating layer may then break out and the machines may break down completely.

It is also known that the hardness of thermally sprayed coating layers and their adhesion to the base material is relatively poor and it has been attempted to alleviate the above-described problem by increasing the stability and adhesion of the coating layer materials. As a result of considerable engineering work, it has been possible to develop coatings with improved stability and adhesion, but breaks still occurred in the coating layers. In principle there has even been an increase in the number of such breaks.

SUMMARY OF THE INVENTION

It is therefore an object of the present invention to provide machine parts which are stressed by friction wear, and particularly piston rings or sealing strips for internal-combustion engines, with coatings, preferably by thermal spraying, in unilateral or bilateral chamber design in a manner such that breaking out of the coating materials can no longer occur.

This and other objects are accomplished, according to the present invention, in a machine part having one surface arranged to be in sliding contact with a cooperating part to thus be subjected to friction wear, the machine part being provided with a recess extending inwardly from the one surface and presenting at least one lateral wall, and the machine part having a layer of material different from the material of the machine part, which layer is disposed in the recess at the sliding surface, by causing the layer to be held in the recess in a manner such that no bond and no adhesion exists between the layer and the lateral wall. Such absence of a bond or adhesion exists over the entire thickness of the layer.

Contrary to prior assumptions, it has surprisingly been found that when the layer and the chamber lateral wall coexist adjacent one another without a bond therebetween, the machine parts that are subject to friction no longer show breaks in the layer even under high thermal and mechanical stresses.

It is therefore important for the practice of the present invention that at least a very thin gap separate the inner chamber wall and the layer of wear resisting material. This can best be effected by forming a notch in the base material of the machine part and/or in the coating layer, for example by milling, by electrochemical or electromechanical processes, or by melting away, or by melting on or vapor-deposition of the layer with, for example, a laser or an electron or plasma jet.

If necessary, the notch may be formed simultaneously with the application of the coating layer. When a spray process is employed, the spray gun may be oriented so as to produce a spray shadow so that no spray material is deposited at the chamber lateral wall. If necessary, this effect can be augmented by forming the chamber lateral wall to slope right from the start in an axial, outwardly oriented direction. By subsequent grinding of the sliding surface, there is then created a bond-free condition between the sprayed coating layer and the chamber lateral wall.

Furthermore, separation of coating layer and chamber lateral wall can be realized if before the actual coating process the chamber lateral walls are covered by intermediate layers which do not adhere to the coating material. If molybdenum is sprayed on, for example, as the coating material, such intermediate layer may be a preliminarily electrochemically deposited copper layer, since copper has practically no adhesion to spray deposited coating layers of molybdenum. In other cases, covering lacquers or special plastics may be used as the intermediate coating layers. These intermediate layers may either be left on after the spray process or they can be removed with relative ease, for example by burning them off.

Generally it is sufficient for the invention if no bond exists between the chamber lateral wall and the coating layer material and if there is practically only a very narrow gap between the two materials. However, according to a preferred embodiment, the gaps are defined by recesses of rectangular or triangular cross section, in the form of wedges with a maximum width of about 0.2 mm. In order to prevent deposits of combustion residues, such as carbon for example, in the recesses, the latter may additionally be filled with organic or inorganic based materials which are easily elastically or plastically deformable.

According to a further inventive solution, a piston ring that has a sprayed protective coating layer with sloped edges is associated with a thin, flat ring of small axial height, preferably made of steel, at one or each side of the chamber. The thin rings may here have the same radial wall thickness as the piston ring or they may have a smaller radial wall thickness and be seated in recesses in the piston ring axial end faces, or sides. After installation in the associated piston groove, the sliding surfaces of the thin rings and of the spray coated piston ring then contact the cylinder sliding surface together. If necessary, the thin rings may be permanently connected with the sides of the piston ring by soldering, riveting or gluing. Preferably, the abutting ends of the rings are offset by about 30° to 60° and are fastened to one another so that a total ring is produced which has a gas-tight gap.

According to the known state of the art, cast iron piston rings are combined with thin steel rings which are preferably disposed on the combustion chamber side of the piston. For example, as disclosed in U.S. Pat. No. 2,609,260 the thin rings can be wound in the form of a spiral and, due to their resiliency, press the cast iron ring firmly against the sides of the piston grooves. According to U.S. Pat. No. 2,746,820, the cast iron ring can be designed as a tapered compression piston ring which strips the oil with its sharp edge while the thin steel ring overlaps the gap defined by the cast iron ring.

However, according to the present invention, such thin rings are combined with spray-covered piston rings. The edges of the sprayed coating layers are effectively mechanically protected by the protruding thin steel rings. Thus, the invention provides a unilateral or bilateral chamber piston ring with spray coating layer in which chamber lateral walls and coating material are separated. During operation of an engine in which such rings are installed the advantages of the coating material come to the fore without producing breaks in the coating layers due to thermal or mechanical stresses which could lead to malfunction of the internal-combustion engines. At the same time, the thin steel rings act in a known manner as oil strippers and sealing rings or, possibly in a spirally wound shape, as annular springs so that power losses due to blow-by are also prevented.

In accordance with a further solution of the above-described problems, the chamber land at one or each side of the piston ring can be pressed axially inwardly after spraying of the coating into the chamber. The coating material is given a pressure bias which is then reduced at the operating temperature of the engine since the coefficient of thermal expansion of the cast iron of the piston ring is about twice that of, for example, molybdenum constituting the spray material. When the coating layer is compressed by about 10 to 20% of its axial dimension, there will no longer be tensile stresses as a result of engine operation, and cracks and breaks in the coating material are avoided.

The machine parts which have been coated in this manner in a single or dual chamber design exhibit no breaks in the coatings even after comparatively long periods of operation under high thermal and mechanical stresses.

DESCRIPTION OF THE PREFERRED EMBODIMENTS

Figure 1:
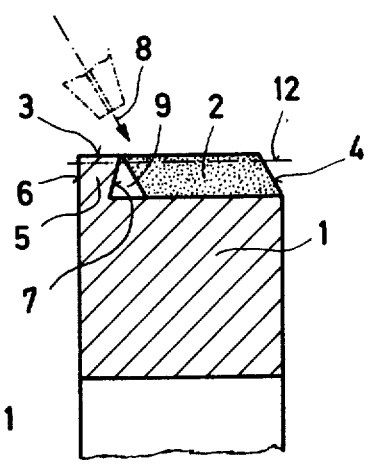
FIG. 1 is a cross-sectional detail view of a piston ring according to a preferred embodiment of the invention having a unilateral chamber and a molybdenum spray coating.

In the embodiment shown in FIG. 1, a piston ring 1 has a molybdenum layer 2 sprayed onto its sliding surface 3. Layer 2 has an exposed outer edge 4 which is sloped in a known manner. The outer border of the piston ring 1 opposite to edge 4 is formed by a bar, or land, 5 of the base material which extends to the sliding surface 3. Its outer side wall 6 forms a sharp corner with the counter surface (not shown) while its inner wall 7 which is sloped radially outwardly away from wall 6 forms the side wall of the chamber for spray layer 2.

By spraying the molybdenum at an angle in the direction of the arrow 8 a wedge-shaped notch 9 has been formed between the inner chamber wall 7 and the spray coating 2, the notch having the form of a spray shadow. After spraying, the sliding surface 3 is ground away to the dashed line 12, so that layer 2 and land 5 are completely out of contact.

Figure 2:
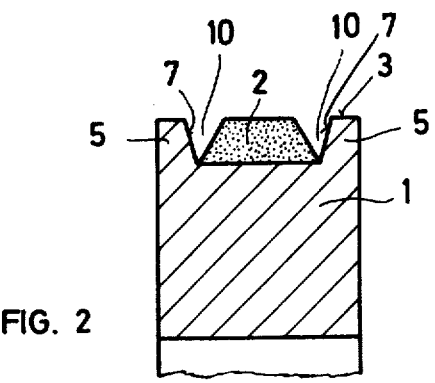
FIG. 2 is a similar cross-sectional view of a piston ring according to a further embodiment of the invention having a bilateral chamber, a molybdenum spray coating and two relief notches.

In FIG. 2, the piston ring 1 is formed with two lands 5 to define a channel, or chamber, into which layer 2 is sprayed. After the spray process, a grinding process is performed to produce two relief notches 10 of wedge-shaped cross section which separate layer 2 from the inner chamber walls 7.

Figure 3:
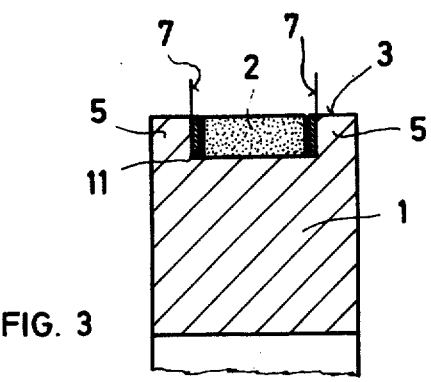
FIG. 3 is a similar cross-sectional view of a further embodiment of a piston ring having a bilateral chamber, a molybdenum coating and an intermediate layer of copper along the chamber walls.

In FIG. 3, the piston ring 1 also has two lands 5, whose inner walls 7 extend in the radial direction and are coated with electrochemically deposited copper layers 11 which separate the spray layer 2 from the inner chamber walls 7 so that no bond is created.

Figure 4:
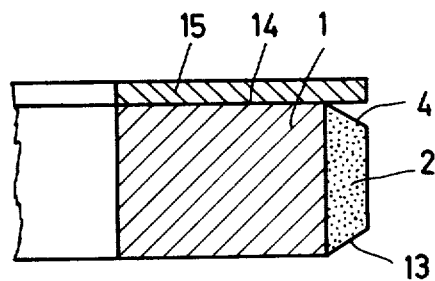
FIG. 4 is a cross-sectional view of a spray-coated compression ring with a laminar steel ring on the combustion chamber side, according to a further embodiment of the invention.

In FIG. 4 a compression ring 1 is covered with a sprayed layer 2 on its sliding surface. The side edges 4 and 13 of layer 2 are sloped. The lateral side 14 of ring 1 which is to face the combustion chamber is protected by a thin steel ring 15 of the same radial wall thickness as the compression ring 1.

Figure 5:
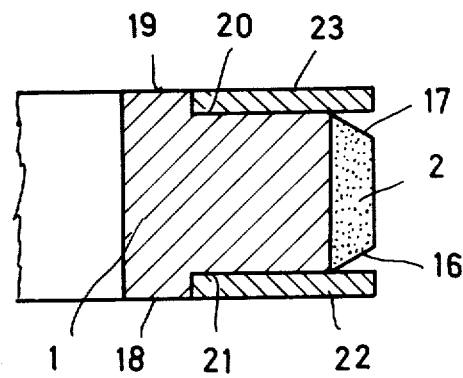
FIG. 5 is a cross-sectional view similar to FIG. 4 of a spray-coated compression ring with laminar steel rings placed on both sides, according to a further embodiment of the invention.

In FIG. 5, a compression ring 1 has its sliding surface covered by a spray layer 2 which is provided with sloped edges 16 and 17. Both lateral sides 18 and 19 of the compression ring 1 are provided with respective recesses 20 and 21 in which respective thin steel rings 22 and 23 are seated.

Figure 6:
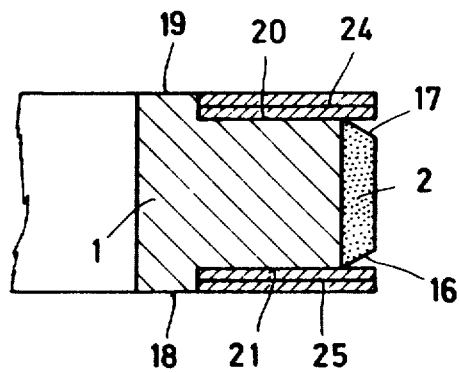
FIG. 6 is a cross-sectional view similar to FIGS. 4 and 5 of a spray-coated compression ring with laminar steel rings in form of a spirally wound annular steel spring placed on both sides, according to a further embodiment of the invention.

In FIG. 6, a compression ring 1 has its sliding surface covered by a spray layer 2 which is provided with sloped edges 16 and 17. Both lateral sides 18 and 19 of the compression ring 1 are provided with respective recesses 20 and 21 in which respective spirally wound annular steel spring rings are seated.

Figure 7:
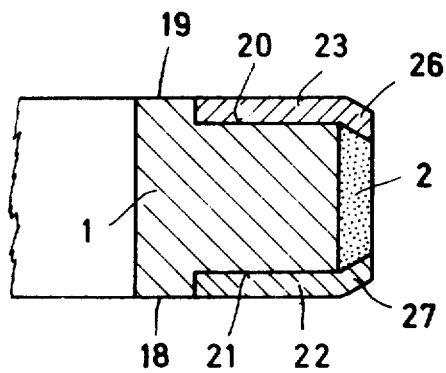
FIG. 7 is a cross-sectional view similar to FIGS. 4, 5 and 6 of a spray-coated compression ring with laminar steel rings whose ends are pressed axially inwardly, according to a further embodiment of the invention.

In FIG. 7, a compression ring 1 has its sliding surface covered by a spray layer 2. Both lateral sides 18 and 19 of the compression ring 1 are provided with respective recesses 20 and 21 in which respective thin steel rings 22 and 23 are seated. The ends 26 and 27 of the steel rings 22 and 23 are pressed axially inwardly after application of the layer 2 so that the sprayed layer 2 is compressed in the direction of its depth by up to about 20% of its original depth.

It will be understood that the above description of the present invention is susceptible to various modifications, changes and adaptations, and the same are intended to be comprehended within the meaning and range of equivalents of the appended claims.

What is claimed is:

1. In a machine part having one surface arranged to be in sliding contact with a cooperating part to thus be subjected to friction wear, the machine part being provided with a recess extending inwardly from the one surface and presenting at least one lateral wall, and the machine part comprising a layer of material different from the material of the machine part, which layer is constituted by a coating sprayed into the recess and extending to the one surface, the improvement wherein said layer is held in said recess in a manner such that no bond exists between said layer and said lateral wall.

2. An article as defined in claim 1 further comprising an intermediate layer disposed between said lateral wall and said layer with no bond existing between said layers.

3. An article as defined in claim 1 wherein said machine part is a piston ring and is formed to present a gap between said lateral wall and said layer.

4. An article as defined in claim 3 wherein said gap has a wedge shape.

5. An article as defined in claim 4 wherein said gap has a maximum width of at least 0.2 mm.

6. An article as defined in claim 4 further comprising a mass of an elastic or plastic material filling said gap.

7. An article as defined in claim 1 comprising a main body and a thin body disposed against said main body and defining said lateral wall.

8. An article as defined in claim 7 constituting a piston ring, wherein said thin body is a steel ring and has the same radial wall thickness as said main body.

9. An article as defined in claim 7 constituting a piston ring, wherein said thin body is a steel ring, said main body is a ring, and one axial end face of said main body is provided with a recess into which said steel ring is placed, said steel ring presenting a sliding surface at the same level as the outer surface of said layer.

10. An article as defined in claim 7 wherein said thin body is of steel and is permanently connected with said main body by soldering, gluing, welding or riveting.

11. An article as defined in claim 7 constituting a piston ring, wherein said thin body is a steel ring fastened in a known manner to the side of said main body with its abutting ends offset with respect to one another.

12. An article as defined in claim 7 constituting a piston ring, wherein said thin body has the form of a spirally wound annular steel spring.

13. An article as defined in claim 1 wherein the portion of said machine part defining said lateral wall is pressed axially inwardly after application of said layer.

14. An article as defined in claim 13 wherein said layer is compressed in the direction of its depth by about 10 to 20% of its original depth.

15. An article as defined in claim 1 wherein said layer is constituted by a coating that is applied by a thermal spray process.

16. An article as defined in claim 1 wherein said layer is made of molybdenum or a molybdenum alloy.

17. An article as defined in claim 1 constituting a piston ring or a sealing strip for an internal combustion engine.

18. An article as defined in claim 17 wherein said machine part presents two spaced lateral walls delimiting respective sides of said recess and no bond exists between said layer and each lateral wall.

* * * * *